June 8, 1926.

E. BUISSON

DISK CLUTCH

Filed June 27, 1923     2 Sheets-Sheet 1

1,588,305

INVENTOR
EUGÈNE BUISSON
BY
ATTORNEY

June 8, 1926.  E. BUISSON  1,588,305
DISK CLUTCH
Filed June 27, 1923  2 Sheets-Sheet 2
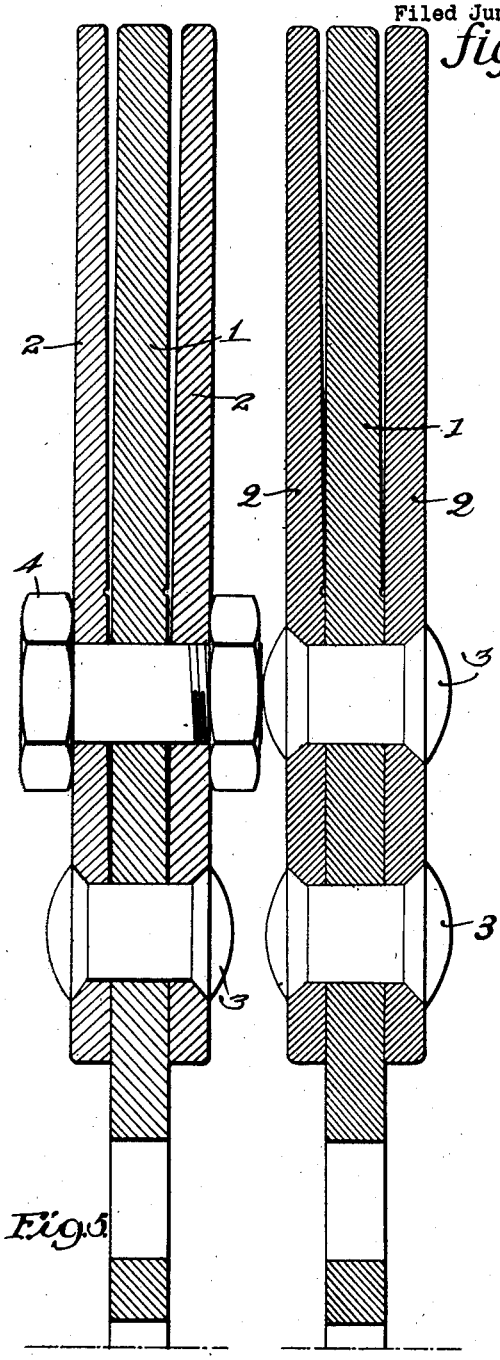
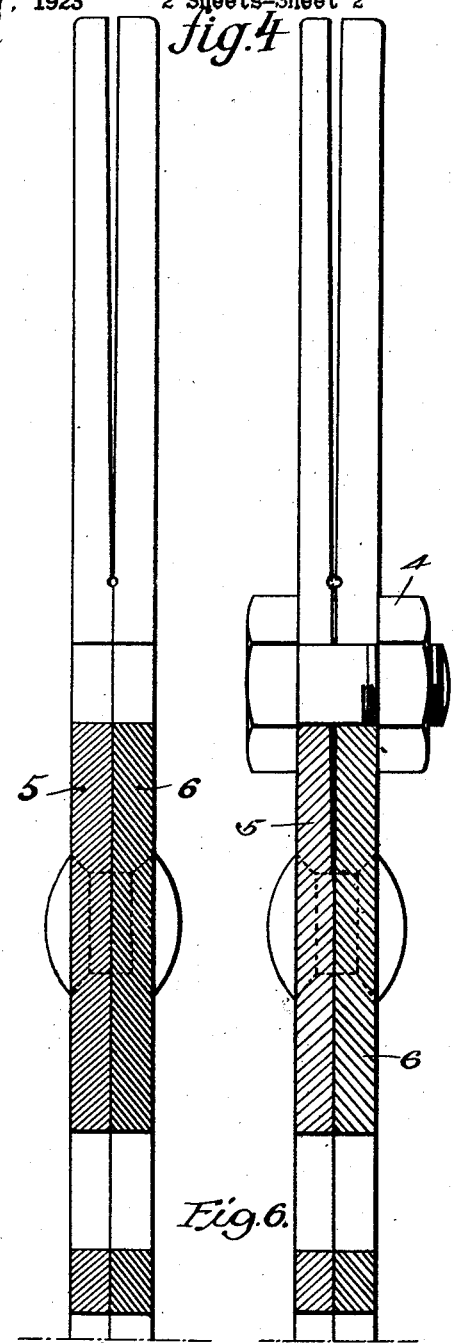
Inventor: EUGÈNE BUISSON
BY
ATTORNEY Patented June 8, 1926.

1,588,305

UNITED STATES PATENT OFFICE.

EUGÈNE BUISSON, OF PARIS, FRANCE, ASSIGNOR TO SOCIÉTÉ ANONYME FRANCAISE DU FERODO, OF PARIS, FRANCE.

DISK CLUTCH.

Application filed June 27, 1923, Serial No. 648,100, and in France July 12, 1922.

In a clutch of the multiple disk type, the friction surface can be made much greater than in any of the other types such as cone or jaw clutches and the like, and therefore the force of friction per unit of surface will remain much smaller. But this is attended with serious drawbacks. Practice shows that no advantage will be obtained by going beyond 700 grammes per square centimetre, and that with a unit pressure of 400 to 500 grammes the friction disks appear to operate in excellent conditions and an easy and silent starting is obtained. These pressures are used with engine speeds between 2,000 and 3,000 revolutions per minute.

In modern motor car construction, the internal diameter of the disks is generally near ¾ the external diameter, and the disks have in fact a ring shape, and for the above reasons it is desired to reduce the width of the ring to a minimum. But this reduction of width is necessarily limited, if the unit pressure of 700 grammes is to be maintained while obviating the use of a great number of driving and actuated disks.

The wear of the disks or rings increases with the distance from the centre of rotation, and the speed of slip will increase in proportion to this distance, and consequently if there is a great difference between the internal and external radius of a given ring, the amount of wear will be very different between the outer and the inner portions and the surface will become thinner near the periphery than near the centre. It follows that the remaining active part of the ring counting from the end of the internal radius will be much reduced and will alone be subjected to the entire load, and the pressure will be increased from the original value of 2.8 to 3.5 kilogrammes, for example. In these conditions the clutch will slip, the disks will be bent or destroyed, and the clutch drive may either cease entirely or may continue simply by jamming, and the clutch cannot be thrown off.

To obviate these numerous drawbacks which come into evidence sooner or later, use may be made of the devices according to the present invention as described hereinafter with reference to the accompanying drawings which are given by way of example.

Figure 1:
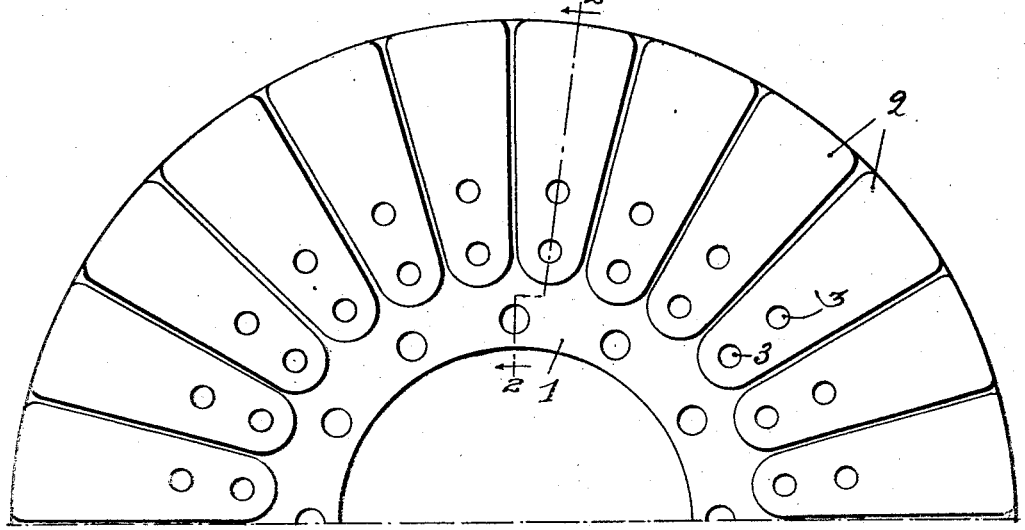
Figure 3:
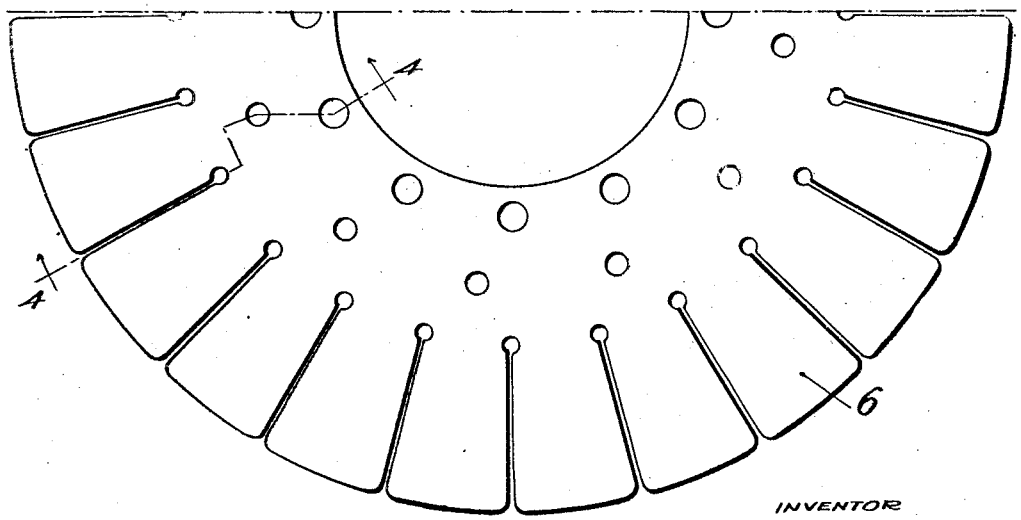

Figure 1 is a view in elevation of one half of a disk; Figure 2 is a section on line 2—2 of Figure 1, on an enlarged scale; Figure 3 is a view in elevation of one half of another form of construction of the disk; Figure 4 is a section on line 4—4 of Figure 3 on an enlarged scale; and Figures 5 and 6 are diametrical sections of other disks provided with setting bolts.

In Figs. 1 and 2, a main supporting disk 1, which is preferably made of a good heat conducting metal, is provided with a plurality of small segments 2—in the greatest possible number—of adequate thickness, made of a very hard steel, for instance saw or spring steel, the said segments or the main disk 1 being bevelled. The said segments are secured to the main disk by rivets 3, or preferably by a rivet 3 and a bolt 4 as shown in Figures 5 and 6, and the latter which is farthest from the centre serves to regulate the tension of the segments and to maintain them in a perfectly parallel position.

Figs. 3 and 4 show a modified form of construction wherein the disk is composed of two plates 5, 6 of steel of the above-mentioned quality, these being formed and assembled as here indicated. They are bevelled on the internal faces whilst the external faces remain perfectly plane. It is obvious that if one gives to the disks a uniform pressure of 700 grammes per square centimetre, for example, and if the outer portions of the disks will not withstand a pressure above 525 grammes without bending, the wear will be uniform upon the whole surface of the disk, in the case of a disk whose inner radius is three-fourths of the outer radius, since 525 represents three-fourths of 700.

The said devices have a further advantage in that spaces are provided between the segments or teeth of the divided disks, which will admit of a very strong ventilation of the frictional parts, resulting in a better dissipation of the heat of friction by conduction and especially by radiation. This latter method of cooling, which is the most important, cannot be used in the known devices by reason of their construction and operation.

The segments are either separately secured (Figs. 1, 2 and 5), or are integral with the disk itself (Figs. 3, 4 and 6).

Figures 5 and 6 show embodiments in which the rivet 3 of the described disks is replaced by a setting bolt 4 serving to regulate the parallel disposition of the external surfaces of the segments (Fig. 5) or of the disk and the segment (Fig. 6).

Claims:

1. A clutch disk for use in a clutch of the multiple disk type and which is divided in the direction of its thickness and so disposed as to leave between the divided parts a space whose width increases from the center to the periphery, the constituting elements of the said disk being beveled on at least one of their faces in such a manner as to provide the said space of increasing width.

2. A clutch disk for use in a clutch of the multiple disk type and comprising a main plate and a plurality of segments mounted on one side of said plate the external surfaces of the main plate and of the segments being parallel whilst their internal surfaces form a small angle with each other.

3. A clutch disk for use in a clutch of the multiple disk type and comprising a main plate and a plurality of segments mounted on one side of said plate, a rivet disposed at the end of each segment adjacent the center and adapted to secure said segment to the main plate, a bolt placed farther from the center and serving to regulate the parallel disposition of the external surfaces of the disk and the segments.

In testimony that I claim the foregoing as my invention I have signed my name.

EUGÈNE BUISSON